(12) United States Patent
Eriksson et al.

(10) Patent No.: US 11,601,960 B2
(45) Date of Patent: Mar. 7, 2023

(54) METHODS AND ARRANGEMENTS FOR RESOURCE ALLOCATION

(71) Applicant: Telefonaktiebolaget L M Ericsson (publ), Stockholm (SE)

(72) Inventors: Erik Eriksson, Linköping (SE); Andreas Bergström, Vikingstad (SE); Martin Hessler, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 392 days.

(21) Appl. No.: 14/439,508

(22) PCT Filed: Nov. 9, 2012

(86) PCT No.: PCT/SE2012/051223
§ 371 (c)(1),
(2) Date: Apr. 29, 2015

(87) PCT Pub. No.: WO2014/074036
PCT Pub. Date: May 15, 2014

(65) Prior Publication Data
US 2015/0305057 A1 Oct. 22, 2015

(51) Int. Cl.
*H04W 72/12* (2009.01)
*H04L 1/18* (2006.01)
(Continued)

(52) U.S. Cl.
CPC ........... *H04W 72/1263* (2013.01); *H04J 4/00* (2013.01); *H04L 1/1812* (2013.01); *H04W 72/1268* (2013.01); *H04W 72/0453* (2013.01)

(58) Field of Classification Search
CPC ......... H04W 72/1263; H04W 72/1268; H04W 72/0453; H04J 4/00; H04L 1/1812;
(Continued)

(56) References Cited

U.S. PATENT DOCUMENTS

2009/0213766 A1   8/2009  Chindapol et al.
2009/0274109 A1*  11/2009 Zhang .................. H04L 1/1614
                                                            370/329
(Continued)

FOREIGN PATENT DOCUMENTS

CN   1787690 A   6/2006
CN   101594205 A  12/2009
(Continued)

OTHER PUBLICATIONS

Interference Management in LTE-Advanced Heterogeneous Networks Using Almost Blank Subframes Author Hisham El Shaer (Year: 2006).*

(Continued)

*Primary Examiner* — Charles C Jiang
*Assistant Examiner* — Voster Preval
(74) *Attorney, Agent, or Firm* — Sage Patent Group

(57) ABSTRACT

A user equipment, a network node and methods thereof for timing of scheduling of resources in a frequency division duplex system are disclosed. The user equipment and network node operate in a frequency division duplex communication system. The network node determines (400) whether a user equipment is prohibited to receive an uplink grant in at least one downlink subframe, e.g. if the user equipment is configured with ABS or with half-duplex operation. Furthermore, if the user equipment is prohibited to receive an uplink grant in at least one downlink subframe, the network node sends (410) an indication to the user equipment to apply a time division duplex configuration to the timing of scheduling of resources. The user equipment receives (420) the indication and thereupon applies (430) the time division duplex configuration to the timing of scheduling of resources.

16 Claims, 5 Drawing Sheets

Blanked subframe

(51) Int. Cl.
*H04W 72/1263* (2023.01)
*H04W 72/1268* (2023.01)
*H04J 4/00* (2006.01)
*H04L 1/1812* (2023.01)
*H04W 72/0453* (2023.01)

(58) Field of Classification Search
CPC ... H04L 1/1819; H04L 1/1893; H04L 1/1887; H04L 1/1896
See application file for complete search history.

(56) References Cited

U.S. PATENT DOCUMENTS

| | | | | |
|---|---|---|---|---|
| 2011/0039568 A1* | 2/2011 | Zhang | ............... | H04W 72/14 455/452.1 |
| 2011/0310830 A1* | 12/2011 | Wu | ............... | H04B 15/00 370/329 |
| 2012/0182908 A1* | 7/2012 | Pan | ............... | H04W 28/18 370/280 |
| 2012/0236736 A1* | 9/2012 | Frank | ............... | H04W 24/04 370/252 |
| 2013/0016656 A1* | 1/2013 | Satou | ............... | H04W 74/0891 370/328 |
| 2013/0040598 A1* | 2/2013 | Kashiwase | ............... | H04W 72/0426 455/404.1 |
| 2013/0114484 A1* | 5/2013 | Suzuki | ............... | H04W 68/025 370/329 |
| 2013/0114573 A1* | 5/2013 | Suzuki | ............... | H04L 1/1887 370/336 |
| 2013/0128782 A1* | 5/2013 | Boixadera | ............... | H04L 5/16 370/281 |
| 2013/0242824 A1* | 9/2013 | Lee | ............... | H04L 1/1819 370/281 |
| 2013/0250772 A1* | 9/2013 | Yin | ............... | H04L 5/16 370/241 |
| 2013/0281076 A1* | 10/2013 | Damnjanovic | ............... | H04W 8/22 455/418 |
| 2013/0315159 A1* | 11/2013 | Xia | ............... | H04W 72/042 370/329 |
| 2014/0016526 A1* | 1/2014 | Ratasuk | ............... | H04W 72/1205 370/296 |
| 2014/0198744 A1* | 7/2014 | Wang | ............... | H04B 7/0617 370/329 |
| 2014/0328326 A1* | 11/2014 | Gunnarsson | ............... | H04W 36/24 370/331 |
| 2015/0016310 A1* | 1/2015 | Yi | ............... | H04L 1/1671 370/277 |
| 2017/0280339 A1* | 9/2017 | Jeong | ............... | H04W 52/365 |

FOREIGN PATENT DOCUMENTS

| | | | | |
|---|---|---|---|---|
| CN | 102474886 A | | 5/2012 | |
| EP | 1 670 277 | | 12/2005 | |
| EP | 2 865 124 B1 | | 6/2013 | |
| EP | 2 853 045 | | 4/2015 | |
| WO | WO-2005032172 A1 * | | 4/2005 | ........ H04W 36/0066 |
| WO | 2008 107856 A2 | | 9/2008 | |

OTHER PUBLICATIONS

PCT International Search Report for International application No. PCT/SE2012/051223, dated Aug. 9, 2013.
R1-105940; 3GPP TSG RAN WG1 Meeting #63; Jacksonville, Florida; Title: ABS Signaling consideration for LTE-A-TDD, Nov. 15-19, 2010.
PCT Written Opinion of the International Searching Authority for International application No. PCT/SE2012/0501223, dated Aug. 9, 2013.
EPO Communication Pursuant to Article 94(3) EPC for Application No. 12 788 320.5-1854—dated May 11, 2017.
First Office Action issued by the Chinese Patent Office for Application No. 201280076989.3—dated Jan. 8, 2018.
English translation of second Office Action in application No. 201280076989.3 dated Oct. 8, 2018 3 pages. All references cited therein have been previously made of record.

* cited by examiner

METHODS AND ARRANGEMENTS FOR RESOURCE ALLOCATION

PRIORITY

This nonprovisional application is a U.S. National Stage Filing under 35 U.S.C. § 371 of International Patent Application Serial No. PCT/SE2012/051223, filed Nov. 9, 2012, and entitled "Methods and Arrangements for Resource Allocation."

TECHNICAL FIELD

The disclosure generally relates to timing the scheduling of resources in a frequency division duplex system, and in particular to a user equipment, a network node and methods therein for timing scheduling of resources.

BACKGROUND

The Universal Mobile Telecommunication System (UMTS) is one of the 3G mobile communication technologies designed to succeed GSM. 3GPP Long Term Evolution (LTE) is a project within the $3^{rd}$ Generation Partnership Project (3GPP) to improve the UMTS standard to cope with future requirements in terms of improved services such as higher data rates, improved efficiency, lowered costs etc. The Universal Terrestrial Radio Access Network (UTRAN) is the radio access network of a UMTS system and Evolved UTRAN (E-UTRAN) is the radio access network of an LTE system. The complete cellular system that comprises an LTE system (and thus E-UTRAN) is denoted Evolved Packet System (EPS).

In order to support high data rates, LTE allows for a system bandwidth of up to 20 MHz. LTE is also able to operate in different frequency bands and can operate in at least FDD (Frequency Division Duplex) and TDD (Time Division Duplex). The modulation technique or the transmission method used in LTE is known as OFDM (Orthogonal Frequency Division Multiplexing). For the next generation mobile communications system e.g. IMT-advanced (International Mobile Telecommunications) and/or LTE-Advanced, which is an evolution of LTE, support for bandwidths of up to 100 MHz is being discussed. In both LTE and LTE-Advanced, radio base stations are known as eNodeBs.

The main difference between FDD and TDD is in how the single channel to provide paths for both uploading and downloading is divided. In FDD this is done by dividing the frequency band allotted into two discrete smaller channels. In TDD the entire channel is used alternating between uploading and downloading.

Because of how FDD operates, it is classified as a full-duplex system. This means that both the upload and download are always available. TDD is half-duplex as either upload or download can use the channel but not at the same time.

In cellular networks with a tight frequency reuse pattern and, especially, during high load scenarios, the need may arise to mitigate the interference using so-called Inter-Cell Interference Coordination (ICIC) techniques for downlink and/or uplink transmissions.

One such technique, specified for LTE as from 3GPP Release 10, is the concept of Almost Blank Subframes (ABS). When using ABS, certain subframes are "blanked", i.e. nothing but reference signals is transmitted in such a blanked subframe. Hence, no information on downlink control channels, i.e. Physical Downlink Control Channel (PDCCH), Physical HARQ Indicator Channel (PHICH), and Physical Control Format Indicator Channel (PCFICH), or on the downlink data channel, i.e. the Physical Downlink Shared Channel (PDSCH), is transmitted during the blanked downlink subframes.

Furthermore, work is ongoing in 3GPP TR 36.888, "Study on provision of low-cost Machine-Type Communications (MTC) User Equipments (UEs) based on LTE", on defining reduced complexity mobile devices. One such device proposal is half-duplex FDD operation devices for LTE (in contrast to the full-duplex requirement on LTE FDD UEs of being the baseline today). MTC devices are to be understood as being a subset of the more general term user equipments.

Uplink transmissions on the Physical Uplink Shared Channel (PUSCH) from the UE to the network, is scheduled by transmitting so-called uplink grants on the PDCCH from the network to the UE. In an LTE FDD system, an uplink grant sent during subframe N schedules an uplink PUSCH transmission during a subframe four subframes later N+4. An example of the timing of scheduling of resources in an LTE FDD system is illustrated in FIG. 1. The UE receives an uplink grant on the downlink DL from the network node in subframe N. The UE is then scheduled to transmit data in the uplink UL during subframe N+4 on the PUSCH.

Now, assume that subframe N is either blanked by ABS or is a non-downlink half-duplex subframe, and thus that no uplink grant can be transmitted on the PDCCH during this subframe. As a consequence, no uplink PUSCH transmission may take place in subframe N+4. Hence, the larger fraction of downlink subframes being blanked by means of ABS, the larger fraction of the uplink will be impossible to use for dynamic scheduling. An illustration of the timing of scheduling of resources in an LTE FDD system using ABS is given in FIG. 2, wherein 25% of the downlink subframes in the cell are blanked by ABS. The blanked subframes are denoted 20 in the figure. Consequently, no uplink transmission may take place in 25% of the uplink subframes, denoted 22. Hence, 25% of the uplink capacity is lost.

In an LTE system where half-duplex FDD operation is used, the same problem exists as no more than half of the subframes can be used for neither the UL nor the DL. Thus, the possibility to adapt to traffic situations that is either uplink or downlink heavy is limited due to the fact that each scheduled subframe needs a subframe on the downlink and each PDSCH transmission needs an uplink subframe for feedback. An illustration of the timing of scheduling of resources in an LTE FDD system where half-duplex FDD operation is used is given in FIG. 3. Only if subframe N is a downlink subframe D, denoted 30, an uplink grant can be transmitted on the PDCCH. Consequently, if subframe N is not a downlink subframe 30, no uplink grant can be transmitted on the PDCCH during this subframe, and hence no uplink transmission can take place in subframe N+4. The problem in this case is however not as significant as in the above mentioned case, since it could still be possible for the network to assign the un-schedulable uplink resources 32 to another UE. This will however still hamper the flexibility in which the UE may operate. It may also lead to higher device energy consumption since the UE needs to stay synchronized to the system for a longer time.

SUMMARY

It is therefore an object to address some of the problems outlined above, by providing an improved solution for timing the scheduling of resources in a FDD system. This object and others are achieved by the methods, the user equipment and the network node according to the independent claims, and by the embodiments according to the dependent claims.

In accordance with a first aspect of embodiments a method in a user equipment for timing the scheduling of resources in a frequency division duplex system is provided. The user equipment communicates with a network node comprised in the frequency division duplex communication system. Furthermore, the method comprises receiving an indication from the network node to apply a time division duplex configuration to a timing of scheduling of resources. Thereupon the time division duplex configuration is applied to the timing of scheduling of resources.

In accordance with a second aspect of embodiments a method in a network node for timing the scheduling of resources in a frequency division duplex system is provided. The network node communicates with a user equipment. The method comprises determining whether the user equipment is prohibited to receive an uplink grant in at least one subframe. Furthermore, if the user equipment is prohibited to receive an uplink grant in at least one subframe, the method further comprises sending an indication to the user equipment to apply a time division duplex configuration to a timing of scheduling of resources.

In accordance with a third aspect of embodiments a user equipment configured to enable timing the scheduling of resources in a frequency division duplex system is provided. The user equipment is configured to communicate with a network node comprised in the frequency division duplex communication system. The user equipment comprises a receiver adapted to receive an indication from the network node to apply a time division duplex configuration to a timing of scheduling of resources. The user equipment further comprises a processing unit adapted to apply the time division duplex configuration to the timing of scheduling of resources.

In accordance with a fourth aspect of embodiments a network node configured to enable timing the scheduling of resources in a frequency division duplex system is provided. The network node is configured to communicate with a user equipment. The network node comprises a processing unit adapted to determine whether the user equipment is prohibited to receive an uplink grant in at least one subframe. Furthermore, if the user equipment is prohibited to receive an uplink grant in at least one subframe, the network node further comprises a transmitter adapted to send an indication to the user equipment to apply a time division duplex configuration to a timing of scheduling of resources.

An advantage of embodiments of the invention is that they provide improved utilization and flexibility of uplink transmission resources in a FDD communication system since they enable the network to schedule uplink transmission which would otherwise be unschedulable.

Another advantage of embodiments of the invention is that they provide the possibility to improve the experienced bit rate of the UE.

Yet another advantage of embodiments of the invention is that they provide the possibility to improve the battery consumption of the UE.

Other objects, advantages and features of embodiments will be explained in the following detailed description when considered in conjunction with the accompanying drawings and claims.

DETAILED DESCRIPTION

In the following, different aspects will be described in more detail with references to certain embodiments and to accompanying drawings. For purposes of explanation and not limitation, specific details are set forth, such as particular scenarios and techniques, in order to provide a thorough understanding of the different embodiments. However, other embodiments that depart from these specific details may also exist.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the embodiments are primarily described in the form of a method and device, they may also be embodied in a computer program product as well as in a system comprising a computer processor and a memory coupled to the processor, wherein the memory is encoded with one or more programs that may perform the functions disclosed herein.

Figure 1:
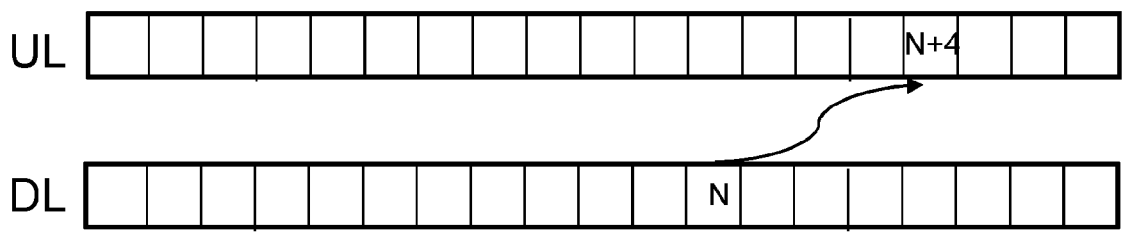
FIG. 1 shows an example of the timing of scheduling of resources in an LTE FDD communications system according to prior art.
Figure 2:
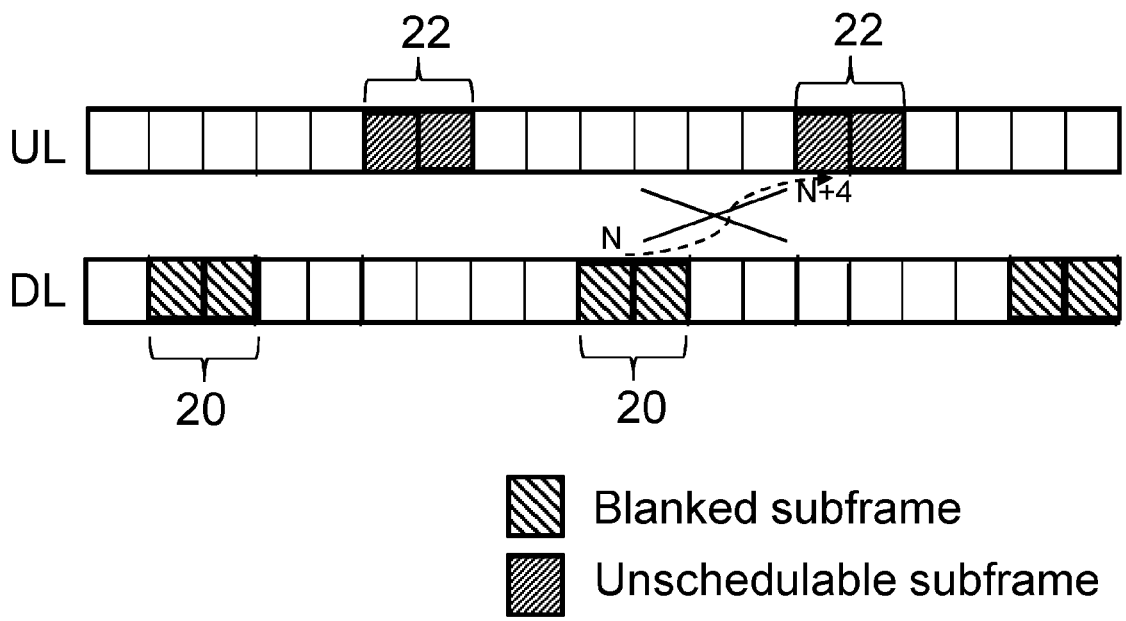
FIG. 2 illustrates the timing of scheduling of resources in an LTE FDD communications system using ABS according to prior art.
Figure 3:
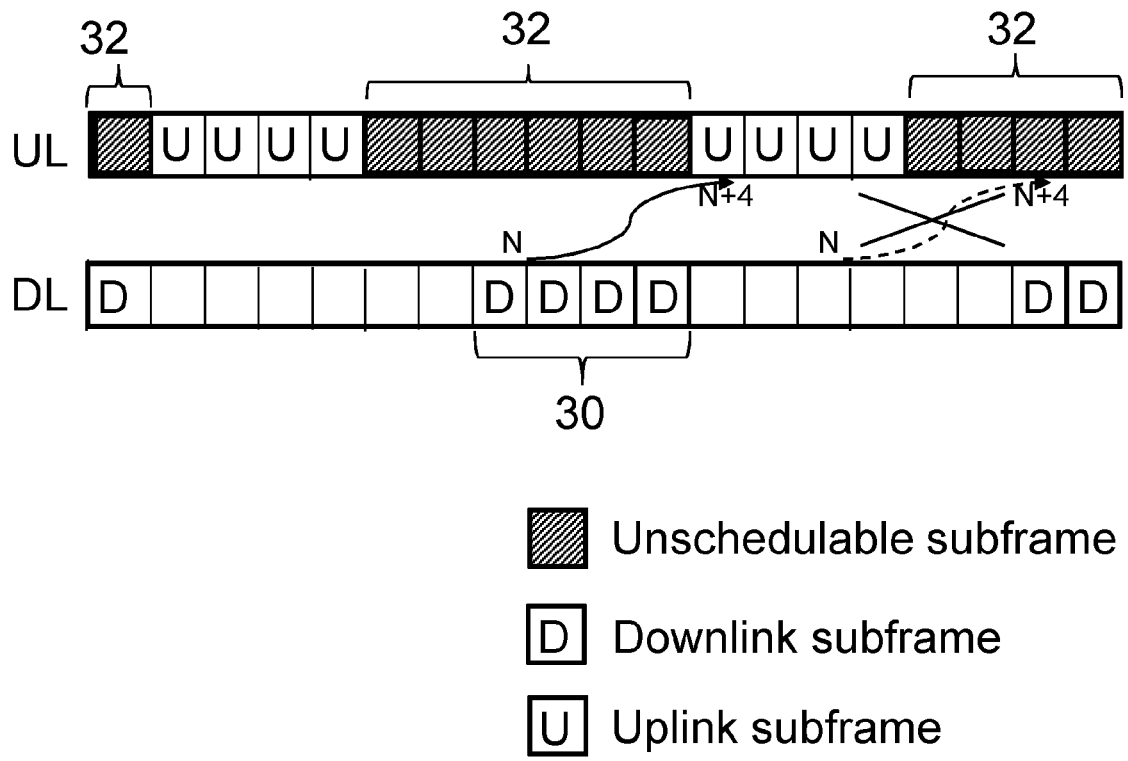
FIG. 3 illustrates the timing of scheduling of resources in an LTE FDD communications system using half-duplex according to prior art.

The following embodiments are described in a non-limiting general context in relation to an example sequence for allocation of resources in a FDD system such as an LTE FDD system, wherein the radio resource management is performed in a distributed way between the radio base stations. The network node may be a radio resource management node, such as a network management node used to control the utilization of the radio resources available within the radio communication system or a radio base station such as an eNodeB. In an LTE FDD system a transmitter and a receiver operate at different carrier frequencies. Therefore network nodes and user equipments (UEs) must be able to send and receive Radio Frequency (RF) signals at the same time. This mode of operation is referred to as duplex mode. Uplink and downlink sub-bands are separated by the frequency offset. In an LTE TDD system time-division multiplexing is applied to separate uplink and downlink signals. It emulates full-duplex communication over a half-duplex communication link. LTE FDD systems require less time synchronization among nodes than LTE TDD systems, and are more efficient in scenarios of symmetric traffic. However, in certain scenarios an UE operating in a FDD system may be prohibited to receive uplink grant in some of the subframes. For example, as mentioned above in connection with FIG. 2 some subframes in downlink 20 may be blanked and hence the UE is prohibited to receive uplink grant in some of the subframes 22. Furthermore, as mentioned above in connection with FIG. 3 some subframes are not downlink subframes and hence the UE is prohibited to receive uplink grant in some of the subframes 32. This problem is addressed by providing an improved solution for timing of scheduling of resources in the FDD system which enables the network to schedule uplink transmissions which would otherwise be un-schedulable.

flowcharts of a method in a network node and a method in a UE according to embodiments are shown. The network node is comprised in a FDD communication system and communicates with several UEs. The network node determines 400 in a first step whether a certain UE of the several UEs is prohibited to receive an uplink grant in at least one downlink subframe, e.g. if the UE is configured with ABS or with half-duplex operation. Furthermore, if the UE is prohibited to receive an uplink grant in at least one downlink subframe the network node sends 410 an indication to the UE to apply a time division duplex configuration to the timing of scheduling of resources. The UE receives 420 the indication and thereupon applies 430 the TDD configuration to the timing of scheduling of resources.

In one embodiment the determining 400 whether the UE is prohibited to receive an uplink grant in at least one subframe is based on if the user equipment is configured with an ABS procedure and/or with a half-duplex operation. By applying the timing of the TDD configuration to the FDD system the downlink subframe blanking by means of ABS and/or half-duplex operation is alleviated.

Figure 5:
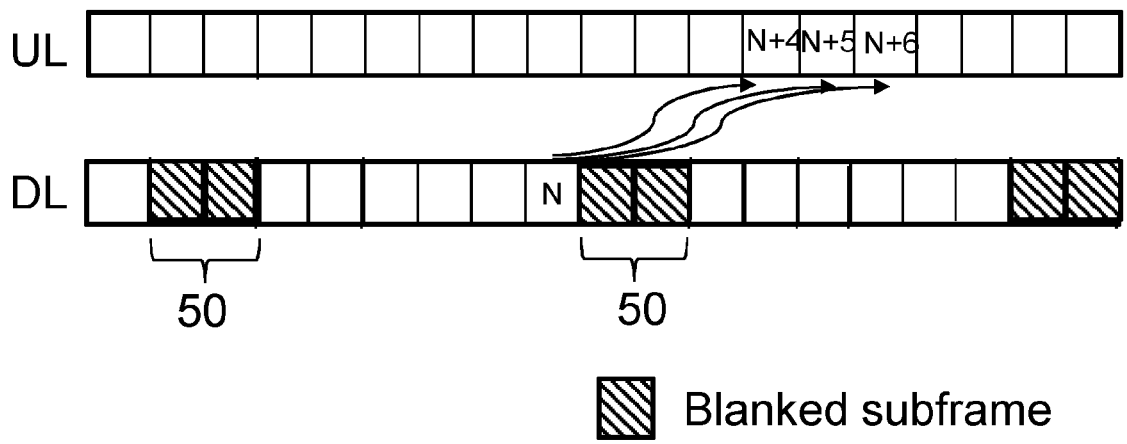
FIG. 5 illustrates the timing of scheduling of resources in an LTE FDD system using ABS wherein the methods according to embodiments are applied.

In an exemplary embodiment, the timing of scheduling of resources is applied to transmitting uplink data according to a timing of a transmission delay for uplink data of the TDD configuration in the UE. By applying the TDD configuration to the timing of transmission delay for uplink data it will be possible for the network node to let the PDCCH transmission during subframe N schedule uplink transmissions on the PUSCH not only for subframe N+4, but also for subsequent subframes e.g. N+5 and N+6. FIG. 5 shows an illustration of an LTE FDD system using ABS and wherein TDD configuration to the timing of transmission delay for uplink data is applied. Even though 25% of the downlink subframes in the cell are blanked by ABS, denoted 50, all uplink subframes are schedulable for uplink transmissions.

When the traffic is asymmetric, e.g. when a vast majority of the traffic is either uplink or downlink transmissions, it is even more beneficial to apply the TDD configuration to the timing of resources in an LTE FDD system. In a further exemplary embodiment the network node may, in addition to determining whether the UE is prohibited to receive an uplink grant in at least one downlink subframe, determine if the traffic is asymmetric.

In order to determine if the majority of the traffic is in uplink, an uplink threshold value may be set. Furthermore, if the UE is prohibited to receive an uplink grant in at least one downlink subframe and is determined by the network node to transmit more in uplink during a time period than the uplink threshold value, the network node sends the indication to the UE to apply the TDD configuration to the timing of scheduling of resources. As an alternative, the network node may determine if the UE transmits more in downlink during a time period than a certain downlink threshold value. In an exemplary embodiment the uplink and downlink threshold values may be predetermined in the network. The network node may continuously measure the traffic of the UE and adaptively determine to indicate to the UE to apply timing of the TDD configuration.

In practically any communications system, occasional data transfer errors arise from, for example, noise, interference, and fading. Retransmission schemes are used to safeguard against these errors and to guarantee the quality of transferred data. The more efficient the retransmission handling, the better use one can make of the radio capabilities. To make the most of its high-performance radio interface, LTE supports a dynamic and efficient two-layered retransmission scheme: A fast hybrid automatic repeat request (HARQ) protocol with low overhead feedback and retransmissions with incremental redundancy is complemented by a highly reliable selective repeat ARQ protocol. The HARQ protocol gives the receiver redundancy information that enables it to avoid a certain amount of errors. The HARQ retransmissions also provide additional redundancy, should the initial transmission not be sufficient to avoid errors.

For LTE FDD operation, HARQ feedback is sent 4 ms after a transmission, a potential retransmission then, at least for uplink, occur 4 ms after the HARQ feedback. The TDD configuration of the HARQ timings is different dependent on the selected uplink-downlink configuration. In an exemplary embodiment, the TDD configuration is further applied to a timing of the HARQ protocol in the LTE FDD system. An advantage of this feature is that time bundling of HARQ feedback can be achieved without defining new HARQ schemes. The network node sends a further indication to the user equipment to apply the TDD configuration to the timing of HARQ protocol. The UE receives the indication and applies the TDD configuration to the timing of HARQ protocol. In one embodiment the UE applies the TDD configuration by transmitting uplink feedback in a subframe according to the timing of the HARQ protocol of the TDD configuration. By configuring a UE with the TDD configuration different UEs in the cell may have different HARQ timing. This would result in a collision risk on both control channels and the uplink data channel in case of retransmission. However, this can be avoided by taking the different round trip times in to account in the scheduler of the network node.

In some embodiments the HARQ feedback mapping for PUCCH will be conducted according to the configured TDD configuration. In other embodiments, a semi-statically configured resource or one of a set of semi-statically configured resources is used on PUCCH. For Physical Hybrid ARQ Indictor Channel (PHICH) signaling some embodiments include additional PHICH resources for subframes not contacting enough PHICH resources. In other embodiments no PHICH is used and a new uplink grant is sent for each HARQ retransmission.

The indications sent from the network node to the UE may be sent over higher layer signaling such as Radio Resource Control (RRC) signaling, in a RRC Reconfiguration Request message or by other means. The TDD configuration may in an embodiment be preconfigured in the user equipment. However, the TDD configuration, or updates of the configuration, may in another embodiment be sent from the network node to the UE by RRC signaling or Media Access Control (MAC) signaling.

The TDD configuration may comprise a TDD uplink/downlink configuration and may also contain a special subframe configuration, an additional Radio Network Temporary Identity (RNTI) connected to the TDD configuration and/or a timing offset for the configuration.

In an exemplary embodiment, the UE may assume that the format used for downlink control information (DCI) follows the format associated with the applied TDD configuration. In another embodiment, the UE may assume the DCI on the common search space follows the FDD configuration while the DCI on the UE specific search space follows the TDD configuration. The DCI format may also be different dependent on the RNTI with which the DCI is scrambled. In other embodiments new DCI formats may be introduced for UEs configured with a TDD configuration in an FDD system.

In an exemplary embodiment, the UE will follow the FDD configuration if it is scheduled on the common search space and the TDD configuration if it is scheduled on the UE specific search space.

A UE which has applied the TDD configuration may in some embodiments disregard grants if the UE is a half-duplex UE and the uplink grant corresponds to a subframe wherein the UE is configured to listen to paging or if the UE needs to read broadcasted system information in that subframe.

In some embodiments of the invention the TDD configuration may also contain a Downlink Pilot Time Slot (DwPTS) configuration applied during the downlink to uplink switching and/or include Uplink Pilot Time Slot (UpPTS) to accommodate switching. In other embodiments the UE may assume that all symbols are used for downlink also in the switching subframes. Different DwPTS/UpPTS configurations may be configured to different users dependent on the estimated radio channel for the UE and/or if the UE is a half duplex UE and the UEs switching capability between UL/DL operations. However, in FDD systems DwPTS/UpPTS subframes could be utilized to lower the requirements of the implementation in the UEs. Hence, the advantage of utilizing DwPTS/UpPTS subframes is that it provides the possibility to lower the cost of UE implementations, however at the cost of losing uplink/downlink resources.

Figure 4:
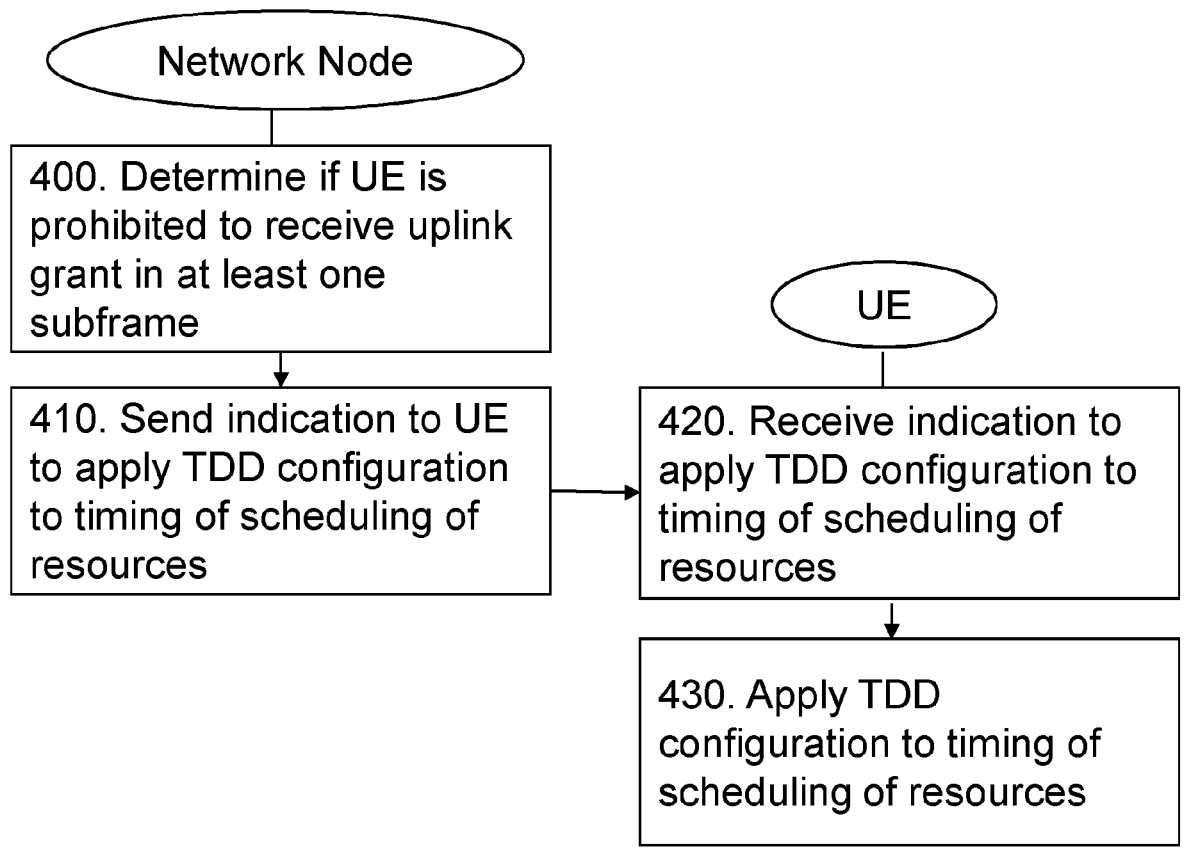
FIG. 4 is a flowchart of the methods in the user equipment and network node according to embodiments.
Figure 6A:
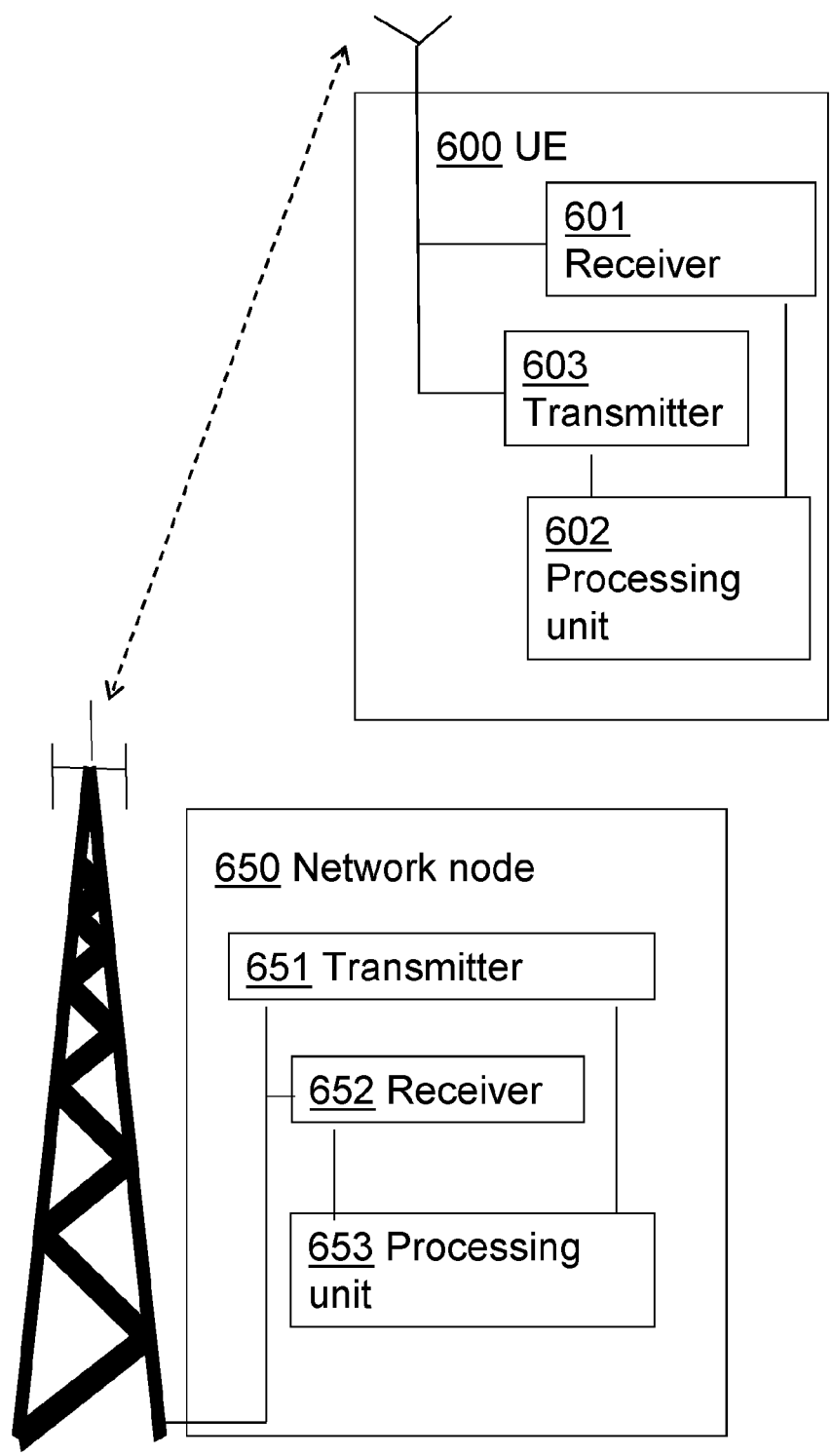
FIGS. 6a-6b are block diagrams illustrating the user equipment and the network node according to embodiments.

A network node 650 and a UE 600 for a wireless communication system are schematically illustrated in the block diagram in FIG. 6a, according to embodiments. The network node 650 and the UE 600 are configured to perform the methods described above in connection with FIG. 4. The UE 600 is configured to communicate with the network node 650, which is comprised in an LTE FDD system. The UE 600 comprises a receiver 601 adapted to receive, from the network node 650, the indication to apply a time division duplex configuration to a timing of scheduling of resources. The UE 600 further comprises a processing unit 602 adapted to apply the time division duplex configuration to the timing of scheduling of resources. The UE 600 further comprises a transmitter 603 configured to send data to the network node 650.

In one embodiment the processing unit 602 included in the UE is further adapted to apply the time division duplex configuration by transmitting uplink data according to a timing of a transmission delay for uplink data of the time division duplex configuration.

In one embodiment the receiver 601 included in the UE 600 is further adapted to receive a further indication from the network node to apply the time division duplex configuration to a timing of a hybrid automatic repeat request (HARQ) protocol; and the processing unit is adapted to apply the time division duplex configuration to the timing of the HARQ protocol.

In one embodiment the processing unit 602 included in the UE 600 is further processing unit is adapted to apply the time division duplex configuration by transmitting uplink feedback in a subframe according to the timing of the HARQ protocol of the time division duplex configuration.

In one embodiment the receiver 601 is further adapted to receive the time division duplex configuration from the network node 650.

Also illustrated in FIG. 6a is the network node 650. The network node, which may be e.g. a radio base station such as the eNodeB, is configured to communicate with the UE 600. The network node comprises a processing unit 653 adapted to determine whether the UE is prohibited to receive an uplink grant in at least one subframe. The network node 650 further comprises a transmitter 651 adapted to send an indication to the UE 600 to apply a time division duplex configuration to a timing of scheduling of resources and a receiver 652.

In one embodiment the processing unit 653 included in the network node 650 is further adapted to determine whether the UE 600 is prohibited to receive an uplink grant in at least one subframe based on if the UE is configured with an ABS procedure.

In one embodiment the processing unit 653 included in the network node 650 is further adapted to determine whether the UE 600 is prohibited to receive an uplink grant in at least one subframe is based on if the UE is configured with a half-duplex operation.

In one embodiment the network node 650 comprises a predetermined uplink threshold value and the processing unit 653 is further adapted to determine whether the UE 600 transmits more in uplink during a time period than the predetermined uplink threshold value.

In one embodiment the network node 650 comprises a predetermined downlink threshold value and the processing unit 653 is further adapted to determine whether the UE 600 transmits more in downlink during a time period than the predetermined downlink threshold value.

In one embodiment the transmitter 651 included in the network node 650 is further adapted to send a further indication to the UE 600 to apply the time division duplex configuration to a timing of a HARQ protocol.

In one embodiment the transmitter 651 included in the network node 650 is further adapted to send the time division duplex configuration to the UE 600.

The units described above with reference to FIG. 6a are logical units and do not necessarily correspond to separate physical units.

Figure 6B:
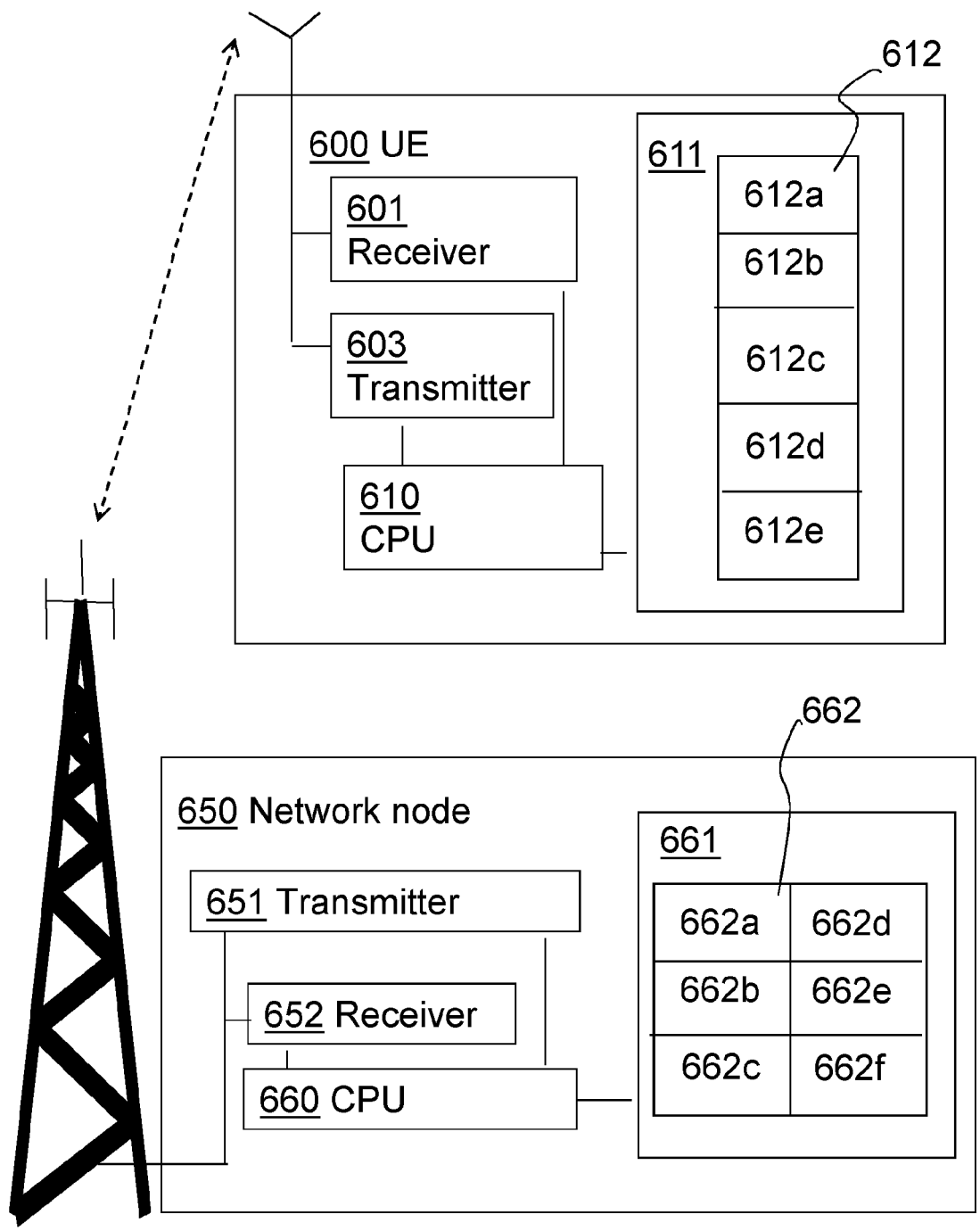

FIG. 6b schematically illustrates an embodiment of the network node 650, and an embodiment of the UE 600 which are alternative ways of disclosing the embodiments illustrated in FIG. 6a. The UE 600 comprises the communication units 601 and 603, which are already described above with reference to FIG. 6a. The UE 600 also comprises a Central Processing Unit (CPU) 610 which may be a single unit or a plurality of units. Furthermore, the UE 600 comprises at least one computer program product 611 in the form of a non-volatile memory, e.g. an EEPROM (Electrically Erasable Programmable Read-Only Memory), a flash memory or a disk drive. The computer program product 611 comprises a computer program 612, which comprises code means which when run on the UE 600 causes the CPU 610 on UE 600 to perform the steps of the method described earlier in conjunction with FIG. 4.

Hence in the embodiments described, the code means in the computer program 612 of the UE 600 comprises a module 612a for receiving an indication from the network node to apply a TDD configuration to a timing of scheduling of resources. Moreover, the computer program 612 also comprises a module 612b for applying the time division duplex configuration to the timing of scheduling of resources. In one embodiment the computer program 612 also comprises a module 612c for receiving a further indication from the network node to apply the time division duplex configuration to a timing of a HARQ protocol and a module 612d for applying the time division duplex configuration to the timing of the HARQ protocol. In one embodiment the computer program 612 also includes a module 612e for receiving the time division duplex configuration from the network node.

The code means may be implemented as computer program code structured in computer program modules. The modules 612a-e essentially perform the steps of the flow described in connection with FIG. 4, thus constituting part of the functionality of the UE 600 described in FIG. 6a. In other words, when the different modules 612a-e are run on the CPU 610, they correspond to the processing unit 602 of FIG. 6a.

The network node 650 illustrated in FIG. 6b comprises a Central Processing Unit (CPU) 660 which may be a single unit or a plurality of units. Furthermore, the network node 650 comprises at least one computer program product 661 in the form of a non-volatile memory, e.g. an EEPROM (Electrically Erasable Programmable Read-Only Memory), a flash memory or a disk drive. The computer program product 661 comprises a computer program 662, which comprises code means which when run on the network node 650 causes the CPU 660 on the network node 650 to perform the steps of the method described earlier in conjunction with FIG. 4.

Hence in the embodiments described, the code means in the computer program 662 of the network node 650 comprises a module 662a for determining whether the UE is prohibited to receive an uplink grant in at least one subframe. The computer program 662 also includes a module 662b for sending an indication to the UE to apply a time division duplex configuration to a timing of scheduling of resources if the UE is prohibited to receive an uplink grant in at least one subframe.

In one embodiment the computer program 662 also includes a module 662c for determining whether the UE transmits more in uplink during a time period than a predetermined uplink threshold value. In one embodiment the computer program 662 also includes a module 662d for determining whether the UE transmits more in downlink during a time period than the predetermined downlink threshold value. In one embodiment the computer program 662 additionally comprises a module 662e for sending a further indication to the UE to apply the time division duplex configuration to a timing of a HARQ protocol. In one embodiment the computer program 662 also includes a module 662f for sending the time division duplex configuration to the UE.

The code means may be implemented as computer program code structured in computer program modules. The modules 662a-f essentially perform the steps of the flow described in connection with FIG. 4, thus constituting part of the functionality of the network node 650 described in FIG. 6a. In other words, when the different modules 662a-f are run on the CPU 660, they correspond to the processing unit 653 of FIG. 6a.

Although the code means in the embodiments disclosed above in conjunction with FIG. 6a-6b are implemented as computer program modules, one or more of the code means may in alternative embodiments be implemented at least partly as so called firmware or programmable or non-programmable hardware circuits.

The above mentioned and described embodiments are only given as examples and should not be limiting. Other solutions, uses, objectives, and functions within the scope of the accompanying patent claims may be possible.

The invention claimed is:

1. A method in a network node for timing of scheduling of resources in a frequency division duplex system, wherein the network node communicates with a user equipment, the method comprising:
    determining that the user equipment is prohibited to receive an uplink grant in at least one subframe in the frequency division duplex system based on the user equipment being configured with an Almost Blank Subframe (ABS) procedure,
        wherein the determining that the user equipment is prohibited to receive an uplink grant in at least one subframe is further based on if the user equipment is configured with a half-duplex operation, and
        wherein the network node comprises a predetermined uplink threshold value;
    determining whether the user equipment transmits more in uplink during a time period than the predetermined uplink threshold value; and
    in response to determining that the user equipment is prohibited to receive the uplink grant in the at least one subframe and the user equipment transmits more in the uplink during the time period than the predetermined uplink threshold value, sending an indication to the user equipment to apply a time division duplex configuration to the timing of scheduling of resources in the frequency division duplex system.

2. The method according to claim 1, wherein the network node comprises a predetermined downlink threshold value, the method further comprising
    determining whether the user equipment transmits more in downlink during a time period than the predetermined downlink threshold value.

3. The method according to claim 1, wherein the timing of scheduling of resources is to be applied to transmitting uplink data according to a timing of a transmission delay for uplink data of the time division duplex configuration.

4. The method according to claim 1, further comprising
    sending a further indication to the user equipment to apply the time division duplex configuration to a timing of a hybrid automatic repeat request protocol.

5. The method according to claim 4, wherein the time division duplex configuration is to be applied to transmitting uplink feedback in a subframe according to the timing of the hybrid automatic repeat request protocol of the time division duplex configuration.

6. The method according to claim 1, wherein the indication is sent by Radio Resource Control (RRC) signaling or Media Access Control (MAC) signaling.

7. The method according to claim 1, further comprising sending the time division duplex configuration to the user equipment.

8. The method according to claim 1, wherein the time division duplex configuration is sent by Radio Resource Control (RRC) Signaling or Media Access Control (MAC) signaling.

9. The method according to claim 1, wherein the network node is at least one of: a radio resource management node, a radio base station, and an eNodeB.

10. The method according to claim 1, further comprising
    determining that traffic between the network node and the user equipment is asymmetric prior to sending the indication to the user equipment to apply the time division duplex configuration to the timing of scheduling of resources in the frequency division duplex system.

11. A network node configured to enable timing of scheduling of resources in a frequency division duplex system, wherein the network node is configured to communicate with a user equipment, the network node comprising:
- a processing unit adapted to determine that the user equipment is prohibited to receive an uplink grant in at least one subframe in the frequency division duplex system based on if the user equipment is configured with an Almost Blank Subframe (ABS) procedure,
- wherein the processor is adapted to determine that the user equipment is prohibited to receive the uplink grant in at least one subframe is based on if the user equipment is configured with a half-duplex operation, and
- wherein the network node comprises a predetermined uplink threshold value;
- determine whether the user equipment transmits more in uplink during a time period than the predetermined uplink threshold value; and
- a transmitter adapted to, in response to the user equipment being prohibited to receive the uplink grant in the at least one subframe and the user equipment transmits more in the uplink during the time period than the predetermined uplink threshold value, send an indication to the user equipment to apply a time division duplex configuration to the timing of scheduling of resources in the frequency division duplex system.

12. The network node according to claim 11, wherein the network node comprises a predetermined downlink threshold value, and wherein the processor is further adapted to determine whether the user equipment transmits more in downlink during a time period than the predetermined downlink threshold value.

13. The network node according to claim 11, wherein the timing of scheduling of resources is to be applied to transmitting uplink data according to a timing of a transmission delay for the uplink data of the time division duplex configuration.

14. The network node according to claim 11, wherein the transmitter is further adapted to send a further indication to the user equipment to apply the time division duplex configuration to a timing of a hybrid automatic repeat request protocol.

15. The network node according to claim 14, wherein the time division duplex configuration is to be applied to transmitting uplink feedback in a subframe according to the timing of the hybrid automatic repeat request protocol of the time division duplex configuration.

16. The network node according to claim 11, wherein the transmitter is further adapted to send the time division duplex configuration to the user equipment.

* * * * *